Patented Jan. 31, 1939

2,145,335

UNITED STATES PATENT OFFICE 2,145,335

METHOD OF REFINING ROSIN

Joseph N. Borglin, Wilmington, Del., assignor to Hercules Powder Company, Wilmington, Del., a corporation of Delaware No Drawing. Application February 23, 1934, Serial No. 712,662

12 Claims. (Cl. 260—107)

This invention relates to a method for refining rosin, and more particularly relates to a method whereby wood or gum rosin may be refined by the removal of color bodies therefrom.

As is well known, rosin contains visible color bodies which render the rosin undesirable for many uses, and it is also known that wood rosin and low grade gum rosin contain so-called latent color bodies which, while not normally visible, darken under certain conditions, as in the presence of an alkali and oxygen, and which render the rosin undesirable for many uses, as in soap making.

Heretofore it has been known that rosin may be refined by the removal of color bodies therefrom, and especially by the removal of latent color bodies from wood rosin, by the treatment of rosin with liquid sulphur dioxide. The refining of rosin by treatment with sulphur dioxide is more particularly described in United States Letters Patent No. 1,715,087, dated May 28, 1929, to George M. Norman, which discloses procedure involving the admixture of liquid sulphur dioxide with a solution of rosin in a usual rosin solvent which is capable of immiscibility with liquid sulphur dioxide, as gasoline; separation of the solution from the liquid sulphur dioxide and recovery of the rosin from the solution. The refining of the rosin is effected by virtue of the fact that liquid sulphur dioxide is a solvent for color bodies contained by the rosin and especially for latent color bodies contained by wood rosin, while, at the same time, it has only a slight solvent action on the rosin as compared with the usual rosin solvents.

Now in accordance with this invention, it has been found that rosin may be refined with the use of sulphur dioxide more advantageously and with greater simplicity, economy and efficiency than heretofore, if the sulphur dioxide be dissolved in a solvent therefor which will not react with the rosin, and which is immiscible or capable of immiscibility with and which may or may not have less solvent power on the rosin than such solvents as are customarily used for dissolving rosin.

In carrying out this invention the solvent for the sulphur dioxide may be any desired solvent therefor which will not react on the rosin and which is immiscible or capable of immiscibility with and may or may not have less solvent power on the rosin than such solvents as are customarily used for dissolving rosin. Thus, by way of illustration and example, ethyl alcohol, methanol, acetone, ethyl acetate, acetic acid, etc., etc., may be used as solvents for the sulphur dioxide. If desired, the sulphur dioxide may be used in solution in another selective solvent for color bodies in rosin, as tetrahydrofurfuryl alcohol, an aqueous phenol solution, or the like, etc. which will act as solvents for the sulphur dioxide without reacting therewith to form dark colored condensation products.

In general, in carrying out this invention for the refining of rosin the rosin will be dissolved in a suitable solvent, such as a light petroleum hydrocarbon, as gasoline, or a terpene hydrocarbon or other customarily used solvent, and the solution treated, as by washing, with a solution of sulphur dioxide in a suitable solvent. Finally, after separation of the two solutions, the refined rosin will be recovered from its solution, for example, by evaporation off of its solvent. Some rosin and color bodies may, if desired, be recovered from the sulphur dioxide solution, for example, by evaporating off the sulphur dioxide solution.

Generally speaking, water miscible solvents for sulphur dioxide will be used, since such characteristic will insure immiscibility with rosin solutions which are generally immiscible with water.

It will be understood that in practical procedure the use of sulphur dioxide solution containing sulphur dioxide in any amount is contemplated and that the procedure may be carried out under any conditions of temperature, pressure, proportions of rosin or rosin solution and sulphur dioxide solution which may be or may be found to be practical for the obtaining of desired refining of such rosin as it may be desired to refine.

As more specifically illustrative of the practical adaptation of this invention to the refining of, for example, wood rosin, for example, a fifty percent solution of sulphur dioxide in acetone is prepared by passing sulphur dioxide gas into a volume of acetone previously cooled to about 0° C. until the final volume is about twice that of the original volume of acetone. A solution of rosin to be refined is then thoroughly washed with the sulphur dioxide solution and the gasoline evaporated for the recovery of the refined rosin.

More specifically, say about 300 grams of a gasoline solution of FF wood rosin, of a concentration of about 13.5% rosin, are washed countercurrently, under a temperature of say about 35° F., say five times with 33 cc. lots of a 50% acetone-sulphur dioxide solution. The refined rosin recovered from the gasoline-rosin solution, after the washing indicated, will grade I in color.

As further illustrative, for example, a solution of sulphur dioxide in methanol may be prepared by passing sulphur dioxide gas into methanol previously cooled to about 0° C. until the concentration of sulphur dioxide in solution is about 70%. Thus, say about 200 grams of a gasoline solution of FF wood rosin of a concentration of about 13.5% rosin, is countercurrently washed at say +10° C., with, say six 30 cc. lots of the methanol-sulphur dioxide solution and a refined rosin, grading M, recovered from the rosin solution by evaporation off of the gasoline.

As illustrative of procedure in accordance with this invention using another selective solvent for color bodies in the rosin, for example, an aqueous phenol, a solution of 300 parts by weight of a gasoline FF rosin solution of a concentration of 13.5% rosin are given two-40 and one-20 parts by volume washes with 85% phenol-water solution which has been previously saturated with SO₂ at room temperature and which contains 20–25% by volume of dissolved SO₂. The washes are given at 22° C. By evaporation of the refined gasoline-rosin solution, after separation from the washing solution, a 59% yield of WG+ rosin will be recovered.

As further illustrative of the procedure in accordance with this invention, tetrahydrofurfuryl alcohol, 50 parts by volume, which has been treated with a condensation agent for furfuryl alcohol, as, for example, a mineral acid, and redistilled, is saturated with sulphur dioxide at 18° C. The final volume increases from 50 to 70. This solution of sulphur dioxide in tetrahydrofurfuryl alcohol is then used to give 200 parts by weight of a gasoline-rosin solution containing 13% of FF rosin one wash at 5° C. After drawing off the lower layer of tetrahydrofurfuryl alcohol-sulphur dioxide-rosin color body solution, the remaining solution of refined rosin is evaporated under reduced pressure and a 65% yield of rosin grading I in color, recovered.

As will be understood, the modus operandi for the refining of rosin in accordance with this invention may be widely varied without departing from the scope of the invention. Thus, for example, where the solvent for the sulphur dioxide, as for example, ethyl alcohol, will dissolve rosin, the rosin may be dissolved in the sulphur dioxide solution and then extracted therefrom with a solvent for rosin, as, for example, gasoline, which is immiscible or capable of immiscibility with the sulphur dioxide solution.

As will be appreciated, the concentration of sulphur dioxide in its solution may vary widely. However, the most satisfactory concentration will be within about the range 40–90% sulphur dioxide, it being generally true that for best results washing under lower temperatures will be desirable with lower concentrations in order to obtain efficient separation of the sulphur dioxide solution from the rosin solution.

It will now be apparent that this invention contemplates the treatment of rosin, either wood or gum rosin, with sulphur dioxide in solution in a solvent for sulphur dioxide which is immiscible or capable of immiscibility with a solution of the rosin in a solvent for rosin, and that this invention is not restricted to the use of any particular solvent for sulphur dioxide, or to any particular concentration of sulphur dioxide, or to procedure under any particular conditions.

It will be appreciated that no particular form of apparatus is required for the carrying out of this invention.

What I claim and desire to protect by Letters Patent is:

1. A method for refining rosin which includes the step of treating rosin for removal of color bodies therefrom with a solution of sulfur dioxide in an organic solvent for sulfur dioxide which is capable of substantial immiscibility with a solvent for rosin.

2. A method for refining rosin which includes the step of treating rosin for removal of color bodies therefrom with a solution of sulfur dioxide in ethyl alcohol.

3. A method for refining rosin which includes treating a solution of rosin in a rosin solvent with a solution of sulfur dioxide in an organic solvent for sulfur dioxide, the rosin solvent and the sulfur dioxide solvent being of such character that the two solutions are capable of substantial immiscibility, separating the treated rosin solution from the sulfur dioxide solution and recovering refined rosin from the rosin solution.

4. A method for refining rosin which includes treating a solution of rosin in a rosin solvent with a 40–90% solution of sulfur dioxide in an organic solvent for sulfur dioxide, the rosin solvent and the sulfur dioxide solvent being of such character that the two solutions are capable of substantial immiscibility, separating the treated rosin solution from the sulfur dioxide solution and recovering refined rosin from the rosin solution.

5. A method for refining rosin which includes dissolving rosin in a solution of sulfur dioxide in an organic solvent for sulfur dioxide which is likewise a solvent for rosin, extracting refined rosin from the resultant solution with a second rosin solvent which has greater solvent power on rosin than the said sulfur dioxide solution and which is capable of substantial immiscibility with said solution and recovering a refined rosin from said extract.

6. A method for refining rosin which includes treating a gasoline solution of rosin with a solution of sulfur dioxide in an organic solvent for sulfur dioxide, the sulfur dioxide solvent being of such character that the two solutions are capable of substantial immiscibility, separating the treated rosin solution from the sulfur dioxide solution and recovering refined rosin from the rosin solution.

7. A method for refining rosin which includes treating a solution of rosin in a rosin solvent with a solution of sulfur dioxide in acetone, the rosin solvent being of such character that the two solutions are capable of substantial immiscibility, separating the treated rosin solution from the sulfur dioxide solution and recovering refined rosin from the rosin solution.

8. A method for refining rosin which includes treating a solution of rosin in a rosin solvent with a solution of sulfur dioxide in methanol, the rosin solvent being of such a character that the two solutions are capable of substantial immiscibility, separating the treated rosin solution from the sulfur dioxide solution and recovering refined rosin from the rosin solution.

9. A method for refining rosin which includes treating a gasoline solution of rosin with a solution of sulfur dioxide in acetone, separating the treated rosin solution from the sulfur dioxide solution and recovering refined rosin from the rosin solution.

10. A method for refining rosin which includes treating a gasoline solution of rosin with a solution of sulfur dioxide in methanol, separating the treated rosin solution from the sulfur dioxide solution and recovering refined rosin from the rosin solution.

11. The method called for in claim 1, additionally characterized by the fact that the organic solvent for sulfur dioxide is itself a selective solvent for color bodies contained in rosin.

12. The method called for in claim 3, additionally characterized by the fact that the organic solvent for sulfur dioxide is itself a selective solvent for color bodies contained in rosin.

JOSEPH N. BORGLIN.